United States Patent
Kadambala et al.

(10) Patent No.: US 10,313,579 B2
(45) Date of Patent: Jun. 4, 2019

(54) DUAL PHASE DETECTION AUTO FOCUS CAMERA SENSOR DATA PROCESSING

(71) Applicant: QUALCOMM Incorporated, San Diego, CA (US)

(72) Inventors: Ravi Shankar Kadambala, Hyderabad (IN); Soman Nikhara, Hyderabad (IN); Bapineedu Chowdary Gummadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 15/693,078

(22) Filed: Aug. 31, 2017

(65) Prior Publication Data

US 2019/0068869 A1 Feb. 28, 2019

(51) Int. Cl.
*G03B 13/00* (2006.01)
*H04N 5/232* (2006.01)
*H04N 5/225* (2006.01)
*H04N 5/369* (2011.01)

(52) U.S. Cl.
CPC ....... *H04N 5/23212* (2013.01); *H04N 5/2254* (2013.01); *H04N 5/3696* (2013.01)

(58) Field of Classification Search
None
See application file for complete search history.

(56) References Cited

U.S. PATENT DOCUMENTS

| | | |
|---|---|---|
| 2003/0169928 A1 | 9/2003 | Stanek |
| 2010/0106918 A1* | 4/2010 | Prabhakar ............. H04N 19/70 711/153 |
| 2010/0259631 A1 | 10/2010 | Sugita |
| 2014/0063329 A1 | 3/2014 | Masuyama |
| 2016/0277668 A1 | 9/2016 | Yokozeki |
| 2016/0360093 A1 | 12/2016 | Ikeda et al. |
| 2017/0163873 A1 | 6/2017 | Kim et al. |

FOREIGN PATENT DOCUMENTS

| | | |
|---|---|---|
| JP | 2017050723 A | 3/2017 |
| WO | 2017002328 A1 | 1/2017 |

OTHER PUBLICATIONS

International Search Report and Written Opinion—PCT/US2018/040365—ISA/EPO—dated Sep. 26, 2018, 13 pp.

\* cited by examiner

*Primary Examiner* — Gary C Vieaux
(74) *Attorney, Agent, or Firm* — Shumaker & Sieffert, P.A.

(57) ABSTRACT

A method of image processing includes capturing two frames of image data using a camera having a phase detection auto focus (PDAF) sensor, subtracting phase difference pixel data associated with the two frames of image data to produce residual phase difference values, detecting a region-of-interest change based on the residual phase differences values, and determining a focus for the PDAF camera sensor based on the detected region-of-interest change. The method may further include compressing the residual phase difference values, sending the compressed residual phase difference values to a processor, and reconstructing, with the processor, the phase difference pixel data from the compressed residual phase difference values.

30 Claims, 8 Drawing Sheets

PHASE DIFFERENCE PIXEL DATA : $Y_L, Y_R$ $Y_L = a*R_L + b*G_L + c*B_L$ $Y_R = a'*R_R + b'*G_R + c'*B_R$

US 10,313,579 B2

DUAL PHASE DETECTION AUTO FOCUS CAMERA SENSOR DATA PROCESSING

TECHNICAL FIELD

The disclosure relates to techniques for processing and transferring data using phase detection auto focus camera sensor.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile telephones, cellular or satellite radio telephones, camera-equipped personal digital assistants (PDAs), computer devices that include cameras such as so-called "web-cams," or any devices with digital imaging or video capabilities.

Certain camera devices include a camera sensor configured to perform one or more aspects of a phase detection auto focus (PDAF) process. In some examples, a camera sensor configured for PDAF may include dual photodiode pixels. Such camera sensors may be referred to as dual PDAF sensors or dual photodiode (2PD) sensors. In some example dual PDAF sensors, two streams of data may be sent to a camera processor. One stream includes the pixel data to be processed when capturing a still image or video. The other stream includes phase difference pixel data used in a phase detection auto focus process.

SUMMARY

In general, this disclosure describes techniques for identifying a change in a region-of-interest between two frames of image data when using a dual PDAF camera sensor. This disclosure further describes techniques for transferring phase difference pixel data from a dual PDAF camera sensor to a camera processor. In some examples, the techniques of this disclosure may reduce bus traffic between a camera sensor and a camera processor, may reduce memory requirements in the camera processor, and may save power.

In one example of the disclosure, a dual PDAF camera sensor may be configured to determine the difference in phase difference pixel data between two frames (e.g., a first frame and a second frame) of image data. The camera sensor may then apply a compression technique on the determined residual phase difference values. The compressed residual phase difference values may then be sent to the camera processor. After receiving the compressed residual phase difference values, the camera processor may reconstruct the phase difference pixel data for the second frame by decompressing the received residual phase difference values and adding them to previously reconstructed phase difference pixel data for the first frame. The phase difference pixel data for the second frame may then be used to determine an autofocus setting (e.g., lens position and/or focal distance) for the camera sensor.

In one example of the disclosure, a method of image processing comprises capturing two frames of image data using a camera having a PDAF sensor, subtracting phase difference pixel data associated with the two frames of image data to produce residual phase difference values, detecting a region-of-interest change based on the residual phase differences values, and determining a focus for the camera based on the detected region-of-interest change.

In another example of the disclosure, an apparatus configured for image processing comprises a PDAF camera sensor, the PDAF sensor configured to capture two frames of image data subtract phase difference pixel data associated with the two frames of image data to produce residual phase difference values, and detect a region-of-interest change based on the residual phase differences values. The apparatus further comprises a processor in communication with the PDAF sensor, the processor configured to determine a focus for the PDAF camera sensor based on the detected region-of-interest change.

In another example of the disclosure, an apparatus configured for image processing comprises means for capturing two frames of image data, means for subtracting phase difference pixel data associated with the two frames of image data to produce residual phase difference values, means for detecting a region-of-interest change based on the residual phase differences values, and means for determining a focus based on the detected region-of-interest change.

In another example, this disclosure describes a computer-readable storage medium storing instructions that, when executed, causes one or more processor to capture two frames of image data using a camera having a PDAF sensor, subtract phase difference pixel data associated with the two frames of image data to produce residual phase difference values, detect a region-of-interest change based on the residual phase differences values, and determine a focus for the camera based on the detected region-of-interest change.

The details of one or more examples are set forth in the accompanying drawings and the description below. Other features, objects, and advantages will be apparent from the description, drawings, and claims.

DETAILED DESCRIPTION

Phase-detection auto focus (PDAF) sensors are widely used in mobile phones. A dual PDAF camera sensor (sometimes called a dual photodiode (2PD) sensor) is a sensor where some or all pixels in the camera sensor array are a phase detection pixel. As will be explained in more detail below, a PDAF sensor may produce two data streams. One stream of pixel values includes the pixel data for the capture of the actual image. Another stream of data includes phase difference pixel values that are used to calculate a defocus distance. The defocus distance may then be used to determine a lens position for the PDAF sensor.

As one example, for a 12M (megapixel) PDAF sensor, there will be 12M×2=24M pixels (left and right photodiodes), assuming that all pixels in the PDAF sensor are dual photodiodes. In addition, such sensors will also transmit 12M phase difference pixel data values to be processed by a camera processor (e.g., an image signal processor (ISP)), which is quite data intensive and power consuming. In addition, the camera processor may be configured to run at double speed to sample the pixel data as well as the phase difference pixel data. This consumes more memory and power.

This disclosure describes techniques to more efficiently transfer phase difference pixel data from a PDAF sensor to a camera processor. The techniques of this disclosure may reduce the memory, power, and timing requirements in a camera processor. The phase difference (e.g., as indicated by the phase difference pixel data) between the pixels only changes between frames if there is any change in the scene or when the object is moved. When the object moves the phase detection data only changes in the moved region-of-interest (ROI).

Rather than sending the entirety of the phase detection data to the camera processor, this disclosure proposes to calculate and send the difference between phase detection data for two frames (e.g., consecutive frames). This difference may be called residual phase difference values. This residual phase difference values may indicate a scene change or a change in ROI of the captured image. In most use cases, only a particular ROI gets changed in the scene. The remaining phase difference pixel data will not change. The residual phase difference values between frames may be compressed (e.g., using run-length encoding). In some examples, the run-length encoding technique is lossless. The compressed residual phase difference values are sent to the camera processor. In the camera processor, the phase difference pixel data for the frame is reconstructed based on the previous frame and sent to other processing blocks in the camera processor for auto focus processing.

Figure 1:
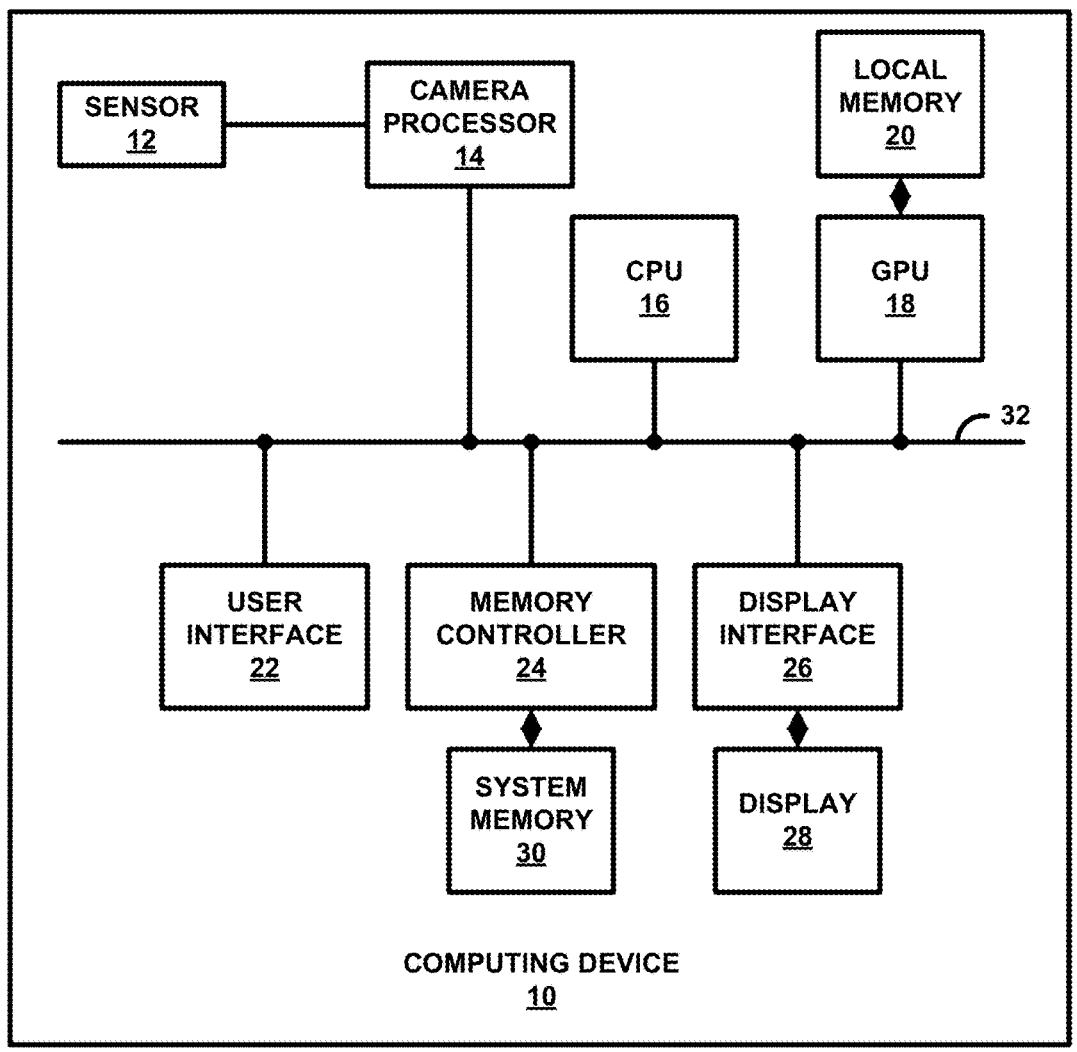
FIG. 1 is a block diagram of a device configured to perform one or more of the example techniques described in this disclosure.

FIG. 1 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device such as a portable video game device or a personal digital assistant (PDA) or any device that may include a camera.

As illustrated in the example of FIG. 1, computing device 10 includes a camera sensor 12 (or simply "sensor 12"), a camera processor 14, a central processing unit (CPU) 16, a graphical processing unit (GPU) 18, local memory 20 of GPU 18, user interface 22, memory controller 24 that provides access to system memory 30, and display interface 26 that outputs signals that cause graphical data to be displayed on display 28. While the example techniques are described with respect to a single sensor 12, the example techniques are not so limited, and may be applicable to the various camera types used for capturing images/videos, including devices that include multiple camera sensors (e.g., dual camera devices).

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques should not be considered limited to the example illustrated in FIG. 1.

The various components illustrated in FIG. 1 (whether formed on one device or different devices), including sensor 12 and camera processor 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Camera processor 14 is configured to receive image frames (e.g., pixel data) from sensor 12, and process the image frames to generate image content. CPU 16, GPU 18, camera processors 14, or some other circuitry may be configured to process the image content captured by sensor 12 into images for display on display 28. In the context of this disclosure, the image frames may be frames of data for a still image, or frames of video data. The pixel data of the image frames may be received by camera processor 14 in any format, including different color formats, including RGB, YCbCr, YUV, and the like.

In some examples, camera processor 14 may be configured as an image signal processor. For instance, camera processor 14 may include a camera interface that interfaces between sensor 12 and camera processor 14. Camera processor 14 may include additional circuitry to process the image content. Camera processor 14 may be configured to perform various operations on image data captured by sensor 12, including auto white balance, color correction, and other image post-processing operations.

In addition, camera processor 14 may be configured to analyze pixel data, including phase difference pixel data, to make image capture configuration changes to sensor 12. For example, camera processor 14 may be configured to analyze pixel data from sensor 12 to set and/or alter exposure control settings. In one example, camera processor 14 may perform an automatic exposure control (AEC) operation. An AEC process include configuring, calculating, and/or storing an exposure setting of sensor 12. An exposure setting may include the shutter speed and aperture setting to use to capture an image.

In other examples, camera processor may be configured to analyze pixel data, including phase difference pixel data, from sensor 12 to set focus settings. An automatic focus (AF) process may include configuring, calculating and/or storing an auto focus setting for sensor 12. As will be explained in more detail below, an AF process may include sending a lens position to sensor 12. In addition, sensor 12 and camera processor 14 may be configured to perform a PDAF process in accordance with the techniques of this disclosure. The techniques of this disclosure may be used in a stand-alone PDAF process, or in a hybrid AF process that uses both PDAF techniques and other AF techniques (e.g., contrast AF).

Camera processor 14 may be configured to output the resulting images (e.g., pixel values for each of the image pixels) to system memory 30 via memory controller 24. Each of the images may be further processed for generating a final image for display. For example, GPU 18 or some other processing unit, including camera processor 14 itself, may perform color correction, white balance, blending, compositing, rotation, or other operations to generate the final image content for display.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processor 14 to process the images captured by sensor 12 in the user-defined manner.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like, in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

Sensor 12 is a camera sensor that may include processing circuitry, an array of pixel sensors (e.g., pixels) for capturing light, memory, an adjustable lens, and an actuator to adjust lens. In accordance with the techniques of this disclosure, sensor 12 is a phase detection auto focus (PDAF) sensor. The array of light-capturing pixels in a PDAF sensor may include a plurality of phase detection pixels. A phase detection pixel may be any pixel that may capture light from two different angles. In one example, a phase detection pixel may be a dual photodiode. In some examples, a dual photodiode may be created by forming a metal mask over the phase detection pixels of sensor 112 to create left and right phase detection pixels. In some examples, only a portion of all pixels in a PDAF sensor are phase detection pixels. In other examples, every pixel of a PDAF sensor is a phase detection pixel.

Masked phase detection pixels are used in pairs (e.g., a left pixel and a corresponding right pixel). When a captured frame of image data is out of focus, the phase detection pixel mask phase shifts the incoming light slightly. The distance between phase detection pixels, combined with their relative shifts, can be convolved to give a determination of roughly how far the optical assembly (e.g., the lens actuator of sensor 12) needs to move the lens to bring the scene into focus. The phase difference detection pixels are provided to obtain a phase difference detection signal indicating defocus values. The defocus values may include a shift direction (defocus direction) and a shift amount (defocus amount) of image focus. Camera processor 14 may be configured to analyze the phase difference values generated by the phase detection pixels of sensor 12 to estimate a level of focus of an in-focus region of interest and to limit the identified phase difference accordingly. That is, camera 14 may use the phase difference values to determine the defocus values, and the associated lens position needed to move the scene into focus.

There are three general types of PDAF sensors that are commonly used: type1 and type2 and type3. A type1 PDAF sensor differs from the other types of PDAF sensors, in that all phase calculation and pixel data separation is performed on the sensor itself. A type1 sensor may be configured to separate the data captured by the sensor into a stream of pixel data (e.g., data used for capturing and storing an image), and phase difference pixel data (e.g., data used for determining the defocus values). The type1 sensor may be further configured to perform any phase difference correction on the pixel data before sending to a camera processor (e.g., camera processor 14). Since some or all pixels of a type 1 sensor are phase detection pixels, the phase difference correction process may be used to provide a single pixel color value for each phase detection pixel. For example, the phase detection correction process may combine the left and right pixel values of a phase detection pixel in some predetermined fashion.

In addition, a type1 sensor may also perform a phase calculation process on the phase detection pixel values to generate defocus values, as discussed above. As such, for PDAF purposes, a type1 sensor provides a camera processor with defocus values, which the camera processor may then translate to a lens position. The camera processor may then instruct such a type1 sensor to adjust the lens based on the determined lens position.

Often, type1 PDAF sensors are not used in mobile devices due to their higher cost. Type1 sensors use considerably more on-board circuitry than other types of PDAF sensors, because they are configured to perform the phase calculation process. For example, in a type2 PDAF sensor, the separation and phase difference correction on the pixel data stream is performed inside the sensor. However, the phase calculation process would be performed by camera processor 14. As such, an entire stream of phase difference pixel data (e.g., phase difference values for every phase detection pixel in the array of sensor 12) is sent to camera processor 14. Camera processor 14 would then perform the phase difference calculation to obtain the defocus values and translate them into a lens position.

Similarly, in a type3 PDAF sensor, an entire stream of phase difference pixel data (e.g., phase difference values for every phase detection pixel in the array of sensor 12) is sent to camera processor 14. Camera processor 14 would then perform the phase difference calculation to obtain the defocus values and translate them into a lens position. In addition, camera processor 14 also performs the separation of the sensor data into a pixel data stream and a phase difference pixel data stream. Camera processor 14 would further be configured to perform any phase difference correction.

Type2 and type3 PDAF sensors are generally cheaper than type1 sensors, but result in more data to be sent to camera processor 14. Furthermore, camera processor 14 performs more of the PDAF process, as camera processor 14 determines the defocus values from the received phase difference pixel data.

As discussed above, for a 12M (megapixel) type2 or type3 PDAF sensor 12, there will be 12M×2=24M pixels (left and right photodiodes), assuming that all pixels in sensor 12 are dual photodiodes. In addition, such a sensor 12 will also transmit 12M phase difference pixel data values to be processed by camera processor 14, which is data intensive and power consuming. In addition, camera processor 14 may be configured to run at double speed to sample the pixel data as well as the phase difference pixel data. This consumes more memory and power.

This disclosure describes techniques to more efficiently transfer phase difference pixel data from sensor 12 to a camera processor 14. The techniques of this disclosure may reduce the memory, power, and timing requirements in camera processor 14. The phase difference (e.g., as indicated by the phase difference pixel data) between the pixels only changes between frames if there is any change in the scene or when the object is moved. When the object moves, the phase detection data only changes in the moved region-of-interest (ROI).

Rather than sending the entirety of the phase detection data to camera processor 14, this disclosure describes a sensor 12 that is configured to calculate and send the differences between phase detection data for two frames (e.g., consecutive frames). These differences may be called residual phase difference values. The residual phase difference values may indicate a scene change or a change in ROI of the captured image. In most use cases, only a particular ROI gets changed in the scene. The remaining phase difference pixel data will not change. Sensor 12 may compress the residual phase difference values between frames (e.g., using run-length encoding). In some examples, the run-length encoding technique is lossless. Sensor 12 sends the compressed residual phase difference values are sent to camera processor 14. In camera processor 14, the phase difference pixel data for the frame is reconstructed based on the previous frame and sent to other processing blocks in camera processor 14 for auto focus processing.

In one example of the disclosure, sensor 12 may be configured to capture two frames of image data. Sensor 12 may be further configured to subtract phase difference pixel data associated with the two frames of image data to produce residual phase difference values. Camera processor 14 may be configured to detect a region-of-interest change based on the residual phase differences values, and determine a focus for the camera that includes sensor 12 based on the detected region-of-interest change.

Figure 2:
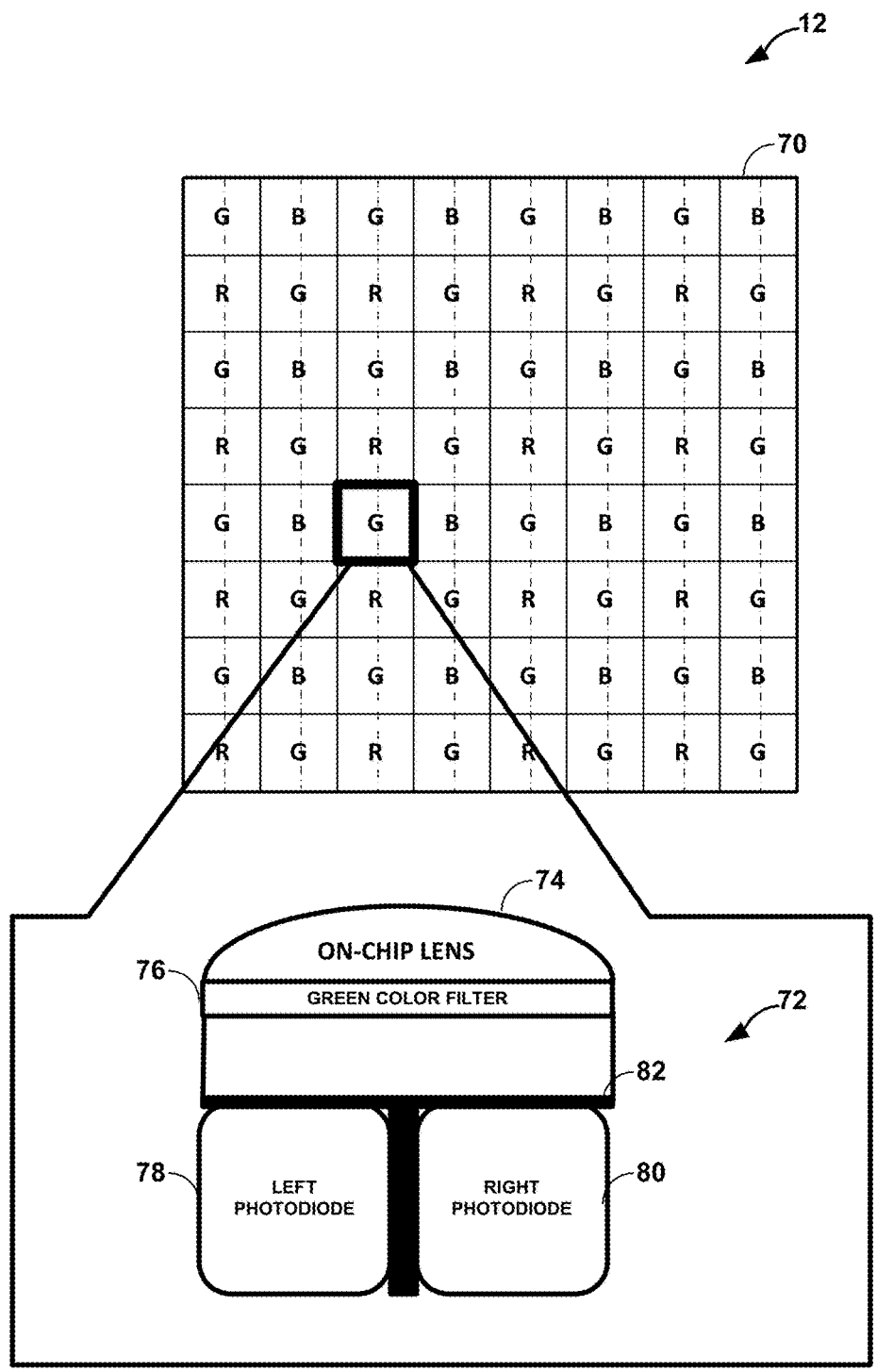
FIG. 2 is a conceptual diagram of an example phase detection auto focus (PDAF) camera sensor.

FIG. 2 is a conceptual diagram of an example phase detection auto focus (PDAF) camera sensor. In the example of FIG. 2, sensor 12 includes a PDAF sensor array 70. PDAF sensor array 70 shows an 8×8 portion of an example sensor array for purposes of illustration. Of course, typical sensor arrays may include millions of pixels. Each pixel in PDAF sensor array 70 is divided into a left and right pixel, as shown by the dashed line. In addition, each pixel in PDAF sensor array is associated with a color filter. The pattern of the color filters shown in FIG. 2 is a called a Bayer filter. A Bayer filter is a color filter array for Red (R), Blue (B), and Green (G) filters arranged on the pixels (e.g., photodiodes or photosensors) of PDAF sensor array 70.

The Bayer filter results in each pixel only capturing one color value for each pixel. Camera processor 14 may produce a full-color image by performing a demosaicing algorithm to interpolate a complete RGB value for each pixel. Demosaicing algorithms use the various color values of surrounding pixels to produce a full color value for a particular pixel.

FIG. 2 also shows an enlarged view of a single pixel 72. Pixel 72, like the other pixels in PDAF sensor array 70, is configured as a phase detection pixel. In this example, pixel 72 is configured as a dual photodiode. However, the phase detection pixels of sensor array 70 may be configured in any manner to capture and output phase difference pixel values.

Pixel 72 may include a mask 82 that divides the photodiodes of pixel 72 into a left photodiode 78 and a right photodiode 80. Pixel 72 need not be limited to photodiodes, but may use any type of photosensors that may be configured to capture light and output an electrical signal indicating the amount of light captured. Pixel 72 may further include a green color filter 76 and an on-chip lens 74. Of course, given the position of pixel 72 in the Bayer filter mask of PDAF sensor array 70, the color filter may be a different color (e.g., red or blue).

Light passes through on-chip lens 74 and then through green color filter 76. The intensity of the green light that is then incident on left photodiode 78 and right photodiode 78 is then converted into an electrical signal. The electrical signal may then be converted to a digital value (e.g., using an analog-to-digital converter). Note that on-chip lens 74 is not the same as the main lens of sensor 12. On-chip lens 74 is a fixed lens associated with pixel 72 of PDAF sensor array 70, while the main lens is the adjustable lens that is part of the entire package of sensor 12. The main lens will be discussed with reference to FIG. 6.

Figure 3:
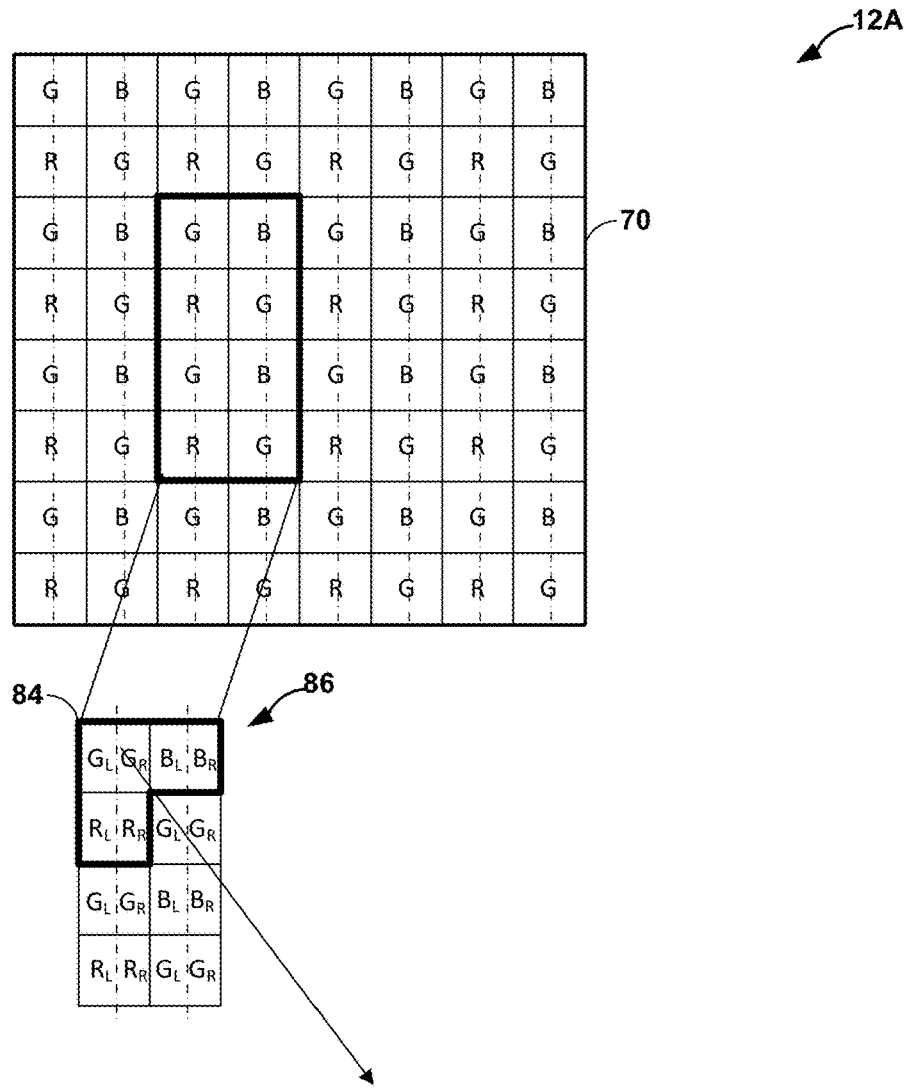
FIG. 3 is a conceptual diagram showing one example technique for determining phase difference pixel data in a PDAF sensor.

FIG. 3 is a conceptual diagram showing one example technique for determining phase difference pixel data in a PDAF sensor. In the example FIG. 3, sensor 12 is a type 2 PDAF sensor (labeled as sensor 12A). PDAF sensor array 70 is the same as shown in FIG. 2. Type2 PDAF sensors (e.g., sensor 12A) are a commonly used sensor type. Examples include the SS2P7 sensor made by Samsung Electronics of Yeongtown, South Korea, and the IMX362 sensor made by the Sony Corporation of Tokyo, Japan.

As described above, in a type2 PDAF sensor, the separation and phase difference correction on the pixel data stream is performed inside the sensor. After separation and correction, the pixel data captured by sensor 12A is averaged and the pixel data is transferred to camera processor 14. For example, sensor 12A may be configured to average both the value of the right photodiode (Rp) and the left photodiode (Lp) to form a complete pixel, which is transferred to camera processor 14 with a unique data type. The data type may indicate to the camera processor 14 that the data is pixel data that is to be used to process and capture an image (e.g., that the data is not to be used for auto focus determination).

In a type2 PDAF sensor, the phase calculation process would be performed by camera processor 14. As such, sensor 12A is configured to send an entire stream of phase difference pixel data (e.g., phase difference values for every phase detection pixel in the array of sensor 12A) to camera processor 14. Camera processor 14 would then perform the phase difference calculation to obtain the defocus values and translate them into a lens position.

Sensor 12A calculates the phase difference pixel data using interpolation of the values of neighbor phase detection pixels. Sensor 12A then transfers the phase detection pixel value to camera processor 14 using a unique data type. As opposed to the pixel data above, this unique data type indicates that the data is phase detection pixel data that is to be used to perform a phase calculation to obtain defocus values.

FIG. 3 shows one example of how to calculate phase difference values for a particular phase detection pixel. The phase difference pixel data may be calculated for both the left photodiode (designated $Y_L$) and the right photodiode (designated $Y_R$). For example, for pixel 84, the surrounding pixel data values in region 86 may be used to interpolate the phase difference values. The phase difference value for the left photodiode of pixel 84 ($Y_L$) and the right photodiode of pixel 84 ($Y_R$) may be interpolated as follows:

$$Y_L = a*R_L + b*G_L + c*B_L$$

$$Y_R = a'*R_R + b'*G_R + c'*B_R$$

The values of $R_L$, $R_R$, $G_L$, $G_R$, $B_L$, and $B_R$ are taken from the photo detection pixels of region 86. The values of constants a, a', b, b', c, and c' may be the same as those used in RGB to YUV or YCrCb color space conversions. However, the values of the constants may be changed based on user preferences. Example default values may be a=0.299, b=0.587, and c=0.114.

FIG. 3 shows one example of how sensor 12A may be configured to calculate phase difference values. However, other techniques may be used. In the context of this disclosure, the phase difference values may be any data generated by a PDAF sensor that may be used by camera processor 14 to perform a phase calculation, determine a defocus value, and/or determine a lens position to focus a camera including the PDAF sensor.

Figure 4:
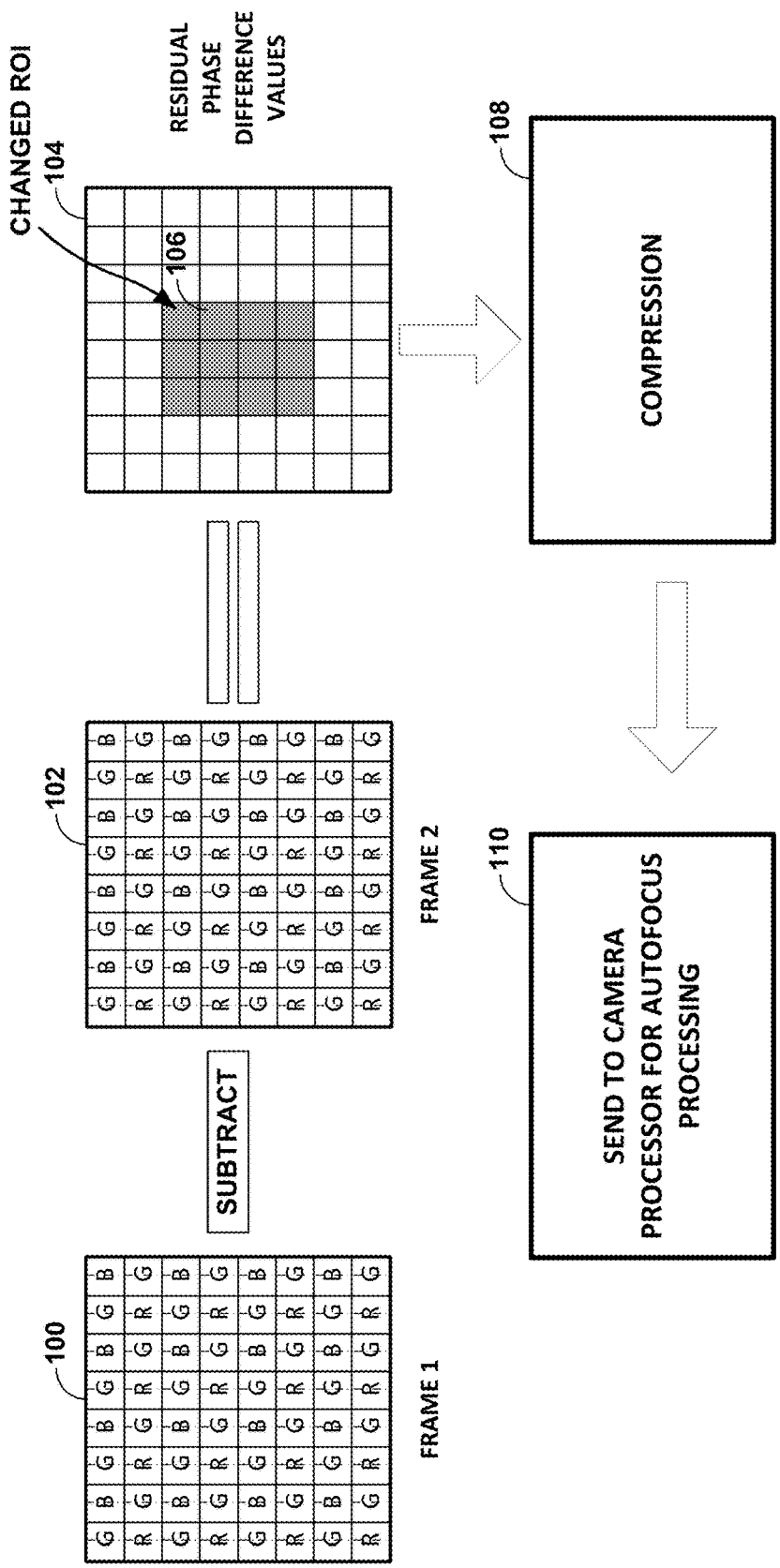
FIG. 4 is a conceptual diagram showing an example technique for processing phase difference pixel data.

FIG. 4 is a conceptual diagram showing an example technique for processing phase difference pixel data. The techniques of FIG. 4 may be performed by sensor 12 of FIG. 1. Sensor 12 may be configured to capture a first frame of image data (Frame 1) and determine first phase difference values 100 for the first frame of image data. Sensor 12 may further capture a second frame of image data (Frame 2) and determine second phase difference values 102 for the second frame of image data.

Sensor 12 may then subtract the second phase difference values from the first phase difference values to produce residual phase difference values 104. Region 106 of residual phase difference values 104 represent non-zero values of the residual phase difference values 104. These non-zero values represent a change in region-of-interest (ROI) between Frame 1 and Frame 2.

Sensor 12 may be configured to calculate the difference between the second phase difference values and the first phase difference values using one or more of an absolute difference and/or a sum of absolute differences. An absolute difference is the absolute value of the difference between two numbers. In this context, two phase difference values of the same pixel location in the sensor array of sensor 12 are calculated, and then the absolute value of this difference is stored. A sum of absolute differences is the sum of these absolute difference values. The total result from the sum of absolute differences calculation may be used as an indication of the similarity of the phase difference values of two frames. The results may be stored in a memory within sensor 12. The calculation of the difference in phase difference values between frames (i.e., the residual phase difference values) may be performed by hardware circuitry within sensor 12 or through software executing on programmable circuitry in sensor 12.

Sensor 12 may then be configured to compress (108) the residual phase difference values (e.g., the absolute differences of the second phase difference values subtracted from the first phase difference values). Sensor 12 may be configured to compress the residual phase difference values using any type of compression. In one example, the compression used is run-length encoding. In general, run-length coding is a form of lossless compression in which runs (e.g., a number of consecutive residual phase difference values in the digital sequence) are indicated by a single value. Since the residual phase difference values are expected to contain a larger number of zeros, sensor 12 may be configured to perform run-length encoding on the residual phase difference values by indicating the number of consecutive zeros, followed by the actual residual phase difference value of any non-zero residual phase difference values between runs of zero values.

In other examples, sensor 12 may be configured to perform lossy compression techniques on the residual phase difference values, as small error or losses in the reconstructed phase difference pixel data may be negligible and may have little effect on PDAF performance.

In some examples, the residual phase difference values may be compared to a tunable threshold for better encoding. For example, prior to compression, sensor 12 may compare the absolute value of the residual phase difference values to a threshold value. If a particular absolute value of a residual phase difference value is at or below the threshold, the residual phase difference value is reduced to zero. If the particular absolute value of the residual phase difference values is above the threshold, the residual phase difference value is unchanged. The threshold may be set by camera processor 14 or may be predetermined. The value of the threshold may be chosen such that small residual phase difference values that are unlikely to result in a different focus setting are reduced to zero, so that better compression may be achieved.

The generated residual phase difference values may often be expected to include a large number zero values because the phase difference between the pixels of consecutive frames only changes if there is any change in the scene or when the object on which the camera is focused has moved. When the object moves, the pixels only change in the moved ROI (see element 106 in FIG. 4).

After compression, sensor 12 may be configured to send the compressed residual phase difference values to camera processor 14 for autofocus processing (110). In one example, sensor 12 may be configured to send the compressed residual phase difference values to camera processor 14 (e.g., before or after the pixel data) with a new data type (e.g., labeled PDAF data). The PDAF data may be sent using a Mobile Industry Processor Interface (MIPI) camera interface. Of course, any method for transferring the data may be used. In other examples, sensor 12 may be configured to send the compressed residual phase difference values to camera processor over the data path used for raw camera pixel data. In this way, the preview path (e.g., the data path used to view the pixel data) is not affected. Sensor 12 may also be configured to send the sum of absolute differences of the residual phase difference values to camera processor 14.

After receipt of compressed residual phase difference values, camera processor 14 may decompress the compressed phased difference values, save the decompressed residual phase difference values in a buffer, and perform an autofocus process for sensor 12.

Figure 5A:
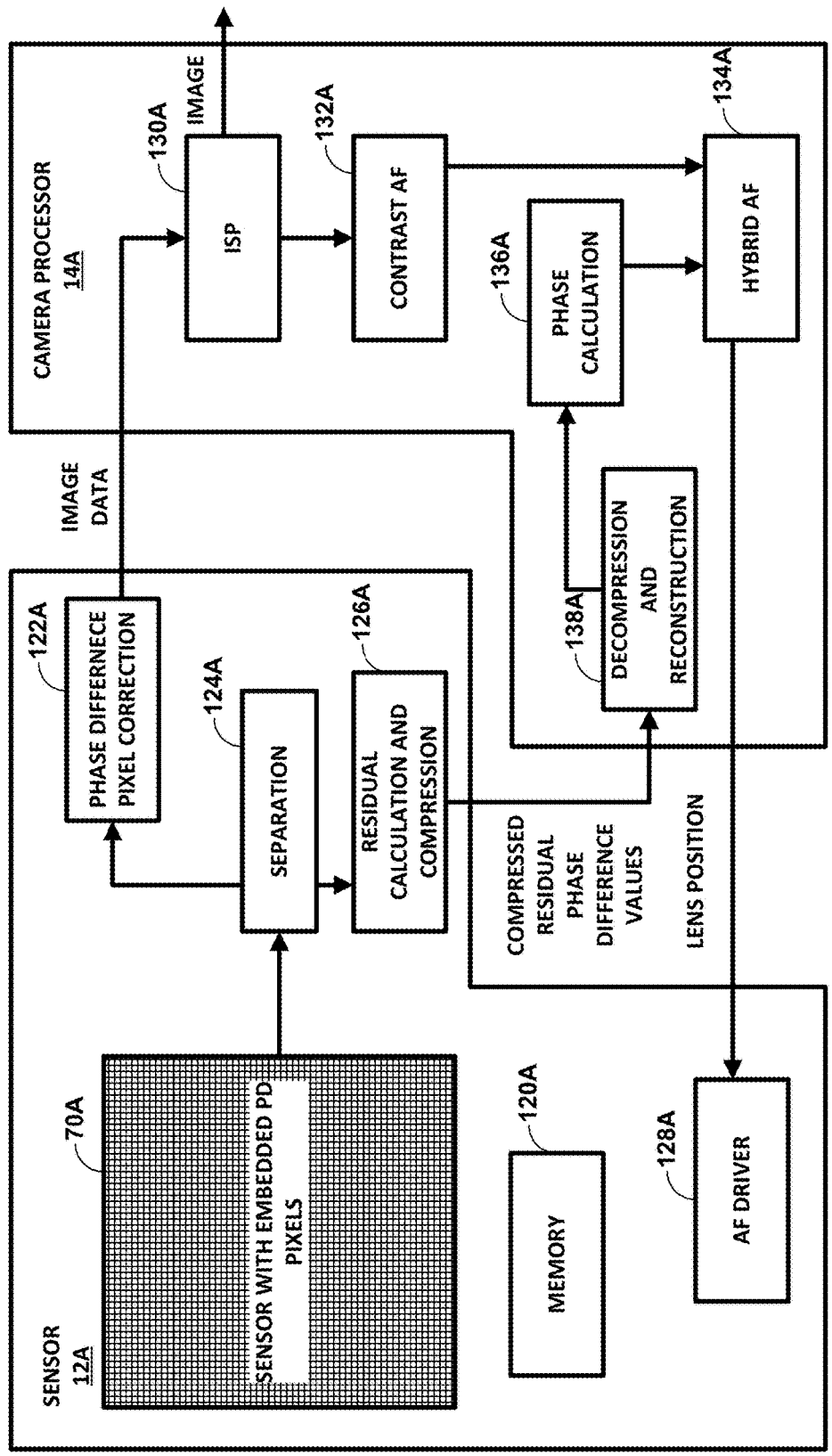
FIG. 5A is a conceptual diagram showing an example PDAF sensor and camera processor configured to perform the techniques of this disclosure.

FIG. 5A is a conceptual diagram showing an example PDAF sensor and camera processor configured to perform the techniques of this disclosure. FIG. 5A shows the configuration of sensor 12A and camera processor 14A in the case that sensor 12A is a type2 PDAF sensor. Each of the structures shown in FIG. 5A may be configured in hardware, firmware, in software executed on a programmable circuit, or as any combination thereof. As discussed above, as a type2 PDAF sensor, sensor 12A may be configured to perform separation and phase difference pixel correction, while camera processor is configured to perform the phase calculation.

Sensor 12A includes a PDAF sensor array 70A. PDAF sensor array 70A includes a plurality of phase detection pixels (e.g., dual photodiode pixels). Sensor 12A may be configured to capture an image. Separation circuit 124A may divide the captured image data of PDAF array 70 into an image data stream and a phase detection data stream. The image data stream may be sent to phase difference pixel correction circuit 122A and then sent as image data (e.g., pixel data) to image signal processor (ISP) 130A of camera processor 14A. ISP 130A may perform auto white balance, color correction, and other image post-processing techniques on the captured image data and output an image to memory (e.g., system memory of FIG. 1).

Separation circuit 124A may send a phase difference pixel data stream to residual calculation and compression circuit 126A. As discussed above with reference to FIG. 4, residual calculation and compression circuit 126A may compute the absolute difference, and optionally, the sum of absolute difference between two frames of phase difference pixel data. Previous frames of phase difference pixel data may be stored in memory 120A. Residual calculation and compression circuit 126A may apply a compression algorithm (e.g., run-length encoding) to the calculated residual phase difference values and send the compressed residual phase difference values to camera processor 14A. In some examples, sensor 12A may also send the calculated sum of absolute differences to camera processor 14A.

Decompression and reconstruction circuit 138A may be configured to decompressed the compressed residual phase difference values. Decompression and reconstruction circuit 138A may be configured to decompress the residual phase difference values using the reciprocal process to that used to compress the residual phase difference values. In some examples, decompression and reconstruction circuit 138A may be configured to reconstruct the second phase difference pixel data from the compressed residual phase difference values. Decompression and reconstruction circuit 138A may be configured to reconstruct the second phase difference pixel data by adding the decompressed residual phase difference values to the first phase difference pixel data that was previously obtained by camera processor 14A.

In other examples, decompression and reconstruction circuit 138A may be configured to analyze the decompressed residual phase difference values and determine if it is necessary to reconstruct the second phase difference pixel data. For example, decompression and reconstruction circuit 138A may be configured to calculate (or receive) a sum of absolute differences of the decompressed residual phase difference values. If the sum of absolute differences is less than some predetermined threshold, decompression and reconstruction circuit 138A may determine to not reconstruct the entirety of the phase difference pixel data for the second frame, and not determine a new auto focus setting for sensor 12A. That is, if the sum of absolute difference of the decompressed phase difference values is less than a predetermined threshold, decompression and reconstruction circuit 138A may determine that the focus setting will not change relative to an earlier frame, and thus camera processor 14A will not need to determine a new focus setting (e.g., lens position). If the sum of absolute difference of the decompressed phase difference values is greater than a predetermined threshold, decompression and reconstruction circuit 138A may determine that the focus setting may or will likely change relative to an earlier frame, and thus camera processor 14A will reconstruct the phase difference pixel data for the second frame and determine a new auto focus setting.

After reconstruction, the second phase difference pixel data is sent to phase calculation circuit 136A. Phase calculation circuit 136A determines the defocus values discussed above. The defocus values may then be used to determine a lens position for sensor 12A.

FIG. 5A shows a hybrid auto focus approach for determining a lens position. In this approach, image data from ISP 130A is processed by contrast AF circuit 132A. In contrast AF, contrast AF circuit 132A adjusts the focus of an image until the maximal contrast between the intensity in adjacent pixels is achieved. The lens position indicated by contrast AF circuit 132A is then supplied to hybrid AF circuit 134A, along with the defocus values provided by phase calculation circuit 136A. Hybrid AF circuit 134A may be configured to fine tune the focus setting (e.g., the lens position) based on the defocus value and the output of contrast AF circuit 132A. A value indicating the desired lens position is then sent to AF driver 128A in sensor 12A. In other examples, camera processor 14A may not use a hybrid AF process, and may instead determine the lens position from the defocused values provided by phase calculation circuit 136A alone. AF driver 128A may then instruct an actuator of sensor 12A to move the lens to the position indicated by the lens position data.

Figure 5B:
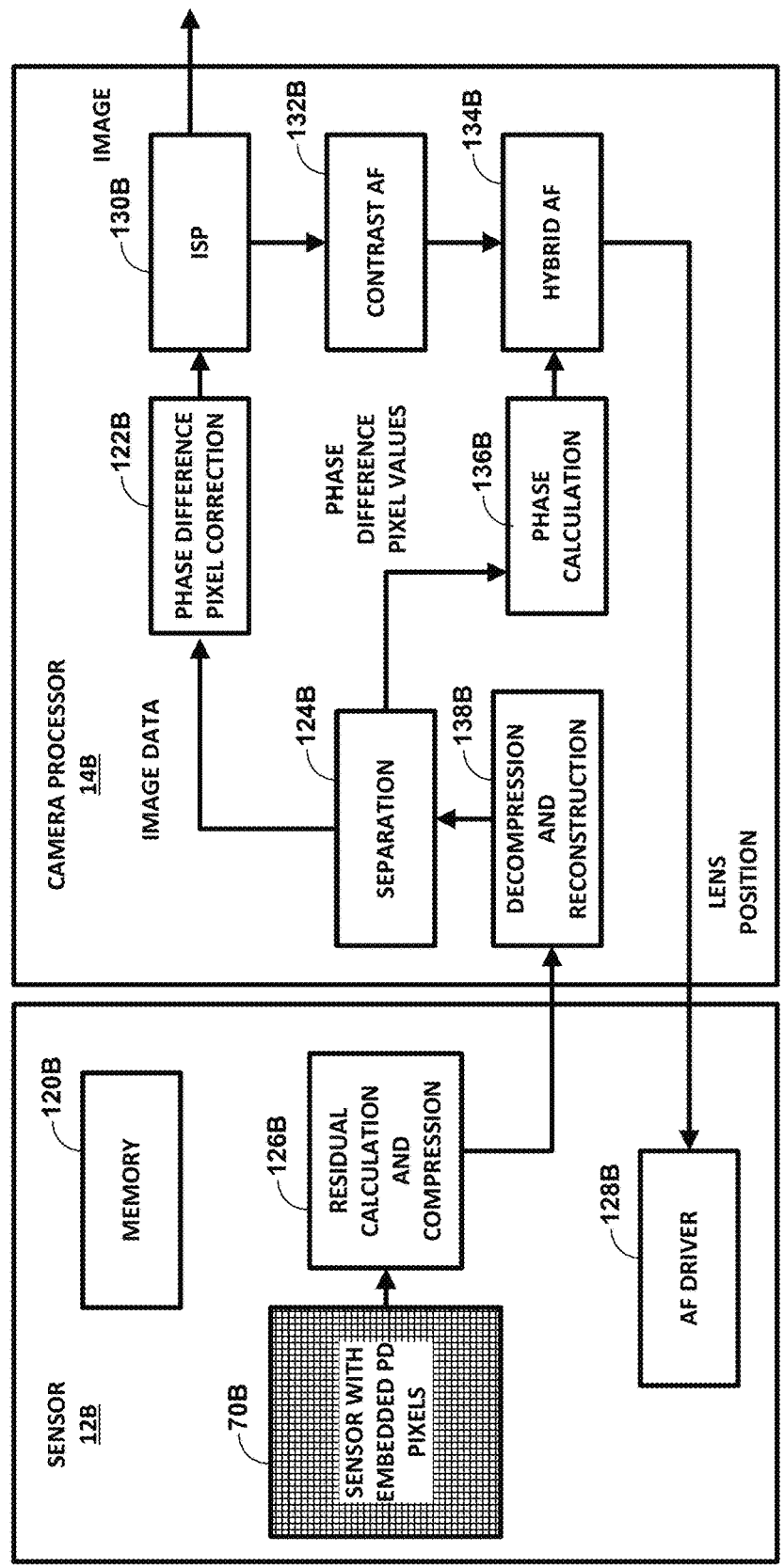
FIG. 5B is a conceptual diagram showing another example PDAF sensor and camera processor configured to perform the techniques of this disclosure.

FIG. 5B is a conceptual diagram showing another example PDAF sensor and camera processor configured to perform the techniques of this disclosure. FIG. 5B shows the configuration of sensor 12B and camera processor 14B in the case that sensor 12B is a type3 PDAF sensor. Each of the hardware structures shown in FIG. 5B may be configured in hardware, firmware, in software executed on a programmable circuit, or as any combination thereof. As discussed above, as a type3 PDAF sensor, camera processor 14B may be configured to perform separation and phase difference pixel correction, in addition to performing the phase calculation.

Sensor 12B includes a PDAF sensor array 70B. PDAF sensor array 70B includes a plurality of phase detection pixels (e.g., dual photodiode pixels). Sensor 12B may be configured to capture an image. The captured image data may be sent to residual calculation and compression circuit 126B. In the context of a type 3 PDAF sensor, residual calculation and compression circuit 126B will operate on the entirety of the data captured by sensor 70B. That is, residual calculation and compression circuit 126B will calculate a residual and perform compression on both pixel data of the captured image and phase difference pixel data. As will be discussed below, separation is performed by camera processor 14B.

Similar to the discussion above with reference to FIG. 4, residual calculation and compression circuit 126B may compute the absolute difference, and optionally, the sum of absolute difference between two frames of pixel data and phase difference pixel data. Previous frames of pixel data and phase difference pixel data may be stored in memory 120B. Residual calculation and compression circuit 126B may apply a compression algorithm (e.g., run-length encoding) to the calculated residual data (e.g., both pixel data and phase difference values) and send the compressed residual data to camera processor 14B. In some examples, sensor 12A may also send the calculated sum of absolute differences to camera processor 14B.

Decompression and reconstruction circuit 138B may be configured to decompress the compressed residual data. As discussed above, the compressed residual data includes both pixel data and phase difference values. Decompression and reconstruction circuit 138B may be configured to decompress the residual data using the reciprocal process to that used to compress the residual data. In some examples, decompression and reconstruction circuit 138B may be configured to reconstruct the pixel data and second phase difference pixel data from the compressed residual values. Decompression and reconstruction circuit 138B may be configured to reconstruct the pixel data second phase difference pixel data by adding the decompressed residual values to pixel data and first phase difference pixel data that were previously obtained by camera processor 14B. Compression and reconstruction circuit 138B may send the data stream to separation circuit 124B.

In other examples, decompression and reconstruction circuit 138B may be configured to analyze the decompressed residual data and determine if it is necessary to reconstruct the residual data to obtain the second phase difference pixel data. For example, decompression and reconstruction circuit 138B may be configured to calculate (or receive) a sum of absolute differences of the decompressed residual data. If the sum of absolute differences is less than some predetermined threshold, decompression and reconstruction circuit 138B may determine to not reconstruct the entirety of the phase difference pixel data for the second frame, and not determine a new auto focus setting for sensor 12B. That is, if the sum of absolute difference of the decompressed residual data is less than a predetermined threshold, decompression and reconstruction circuit 138B may determine that the focus setting will not change relative to an earlier frame, and thus camera processor 14B will not need to determine a new focus setting (e.g., lens position). In some examples, because the residual data includes both residual pixel data and residual phase difference values for type 3 sensors, the threshold for sending the residual data for a type 3 sensor may be smaller than for a type 2 sensor. This ensures that pixel data is still sent even if there is only a small change between two frames. If the sum of absolute difference of the decompressed residual data is greater than or equal to a predetermined threshold, decompression and reconstruction circuit 138B may determine that the focus setting may or will likely change relative to an earlier frame, and thus camera processor 14B will reconstruct the phase difference pixel data for the second frame and determine a new auto focus setting.

Separation circuit 124B may divide the captured image data from sensor 12B into an image data stream and a phase detection data stream. The image data stream may be sent to phase difference pixel correction circuit 122B and then sent as image data (e.g., pixel data) to image signal processor (ISP) 130B of camera processor 14B. ISP 130B may perform auto white balance, color correction, and other image post-processing techniques on the captured image data and output an image to memory (e.g., system memory of FIG. 1).

After separation, the second phase difference pixel data is sent to phase calculation circuit 136B. Phase calculation circuit 136B determines the defocus values discussed above. The defocus values may then be used to determine a lens position for sensor 12B.

FIG. 5B shows a hybrid auto focus approach for determining a lens position. In this approach, image data from ISP 130B is processed by contrast AF circuit 132B. In contrast AF, contrast AF circuit 132B adjusts the focus of an image until the maximal contrast between the intensity in adjacent pixels is achieved. The lens position indicated by contrast AF circuit 132B is then supplied to hybrid AF circuit 134B, along with the defocus values provided by phase calculation circuit 136B. Hybrid AF circuit 134B may then fine tune the focus setting (e.g., the lens position) based on the defocus value and the output of contrast AF circuit 132B. A value indicating the desired lens position is then sent to AF driver 128B in sensor 12B. In other examples, camera processor 14B may not use a hybrid AF process, and may instead determine the lens position from the defocused values provided by phase calculation circuit 136B alone. AF driver may 128B then instruct an actuator of sensor 12B to move the lens to the position indicated by the lens position data.

Figure 6:
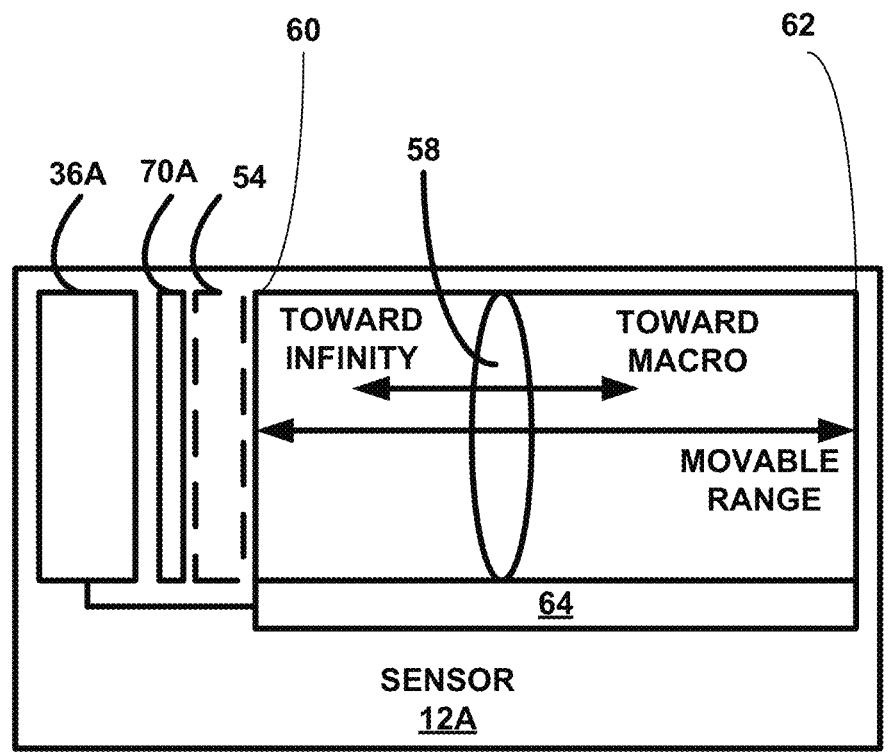
FIG. 6 is a block diagram illustrating an example PDAF sensor module.

FIG. 6 is a block diagram illustrating an example camera including a PDAF sensor module. For example, FIG. 6 illustrates sensor 12A in further detail. Sensor 12B may be similar to sensor 12A.

As illustrated in FIG. 6, sensor 12A includes PDAF sensor array 70A (as one non-limiting example) for capturing light, and sensor chip 36A. Additionally, sensor 12A includes mounting space 54 and an autofocus (AF) component. The AF component includes actuator 66 and lens 58. Actuator 64 may be configured to move lens 58 between first end 60 and second end 62. One way in which actuator 64 moves lens 58 is via a voice coil motor (VCM). For instance, actuator 64 includes a VCM with a spring attached to lens 58. It should be understood that actuator 64 is illustrated to assist with understanding, and need not be sized or positioned in the manner illustrated in FIG. 6.

In FIG. 6, the scene to be captured is to the right of the sensor 12A so that light enters through lens 58 and into the PDAF sensor array 70A. First end 60 may be for the infinity position, and second end 62 may be for the macro position. Infinity position is the place where lens 58 is near to PDAF sensor array 70A (e.g., near to the image sensor), and macro position is the place where lens 58 is far from PDAF sensor array 70A (e.g., far from the image sensor). AF driver 128A (see FIG. 5A) may be configured to cause actuator 66 to move lens 58 to a lens position received from camera processor 14A.

Figure 7:
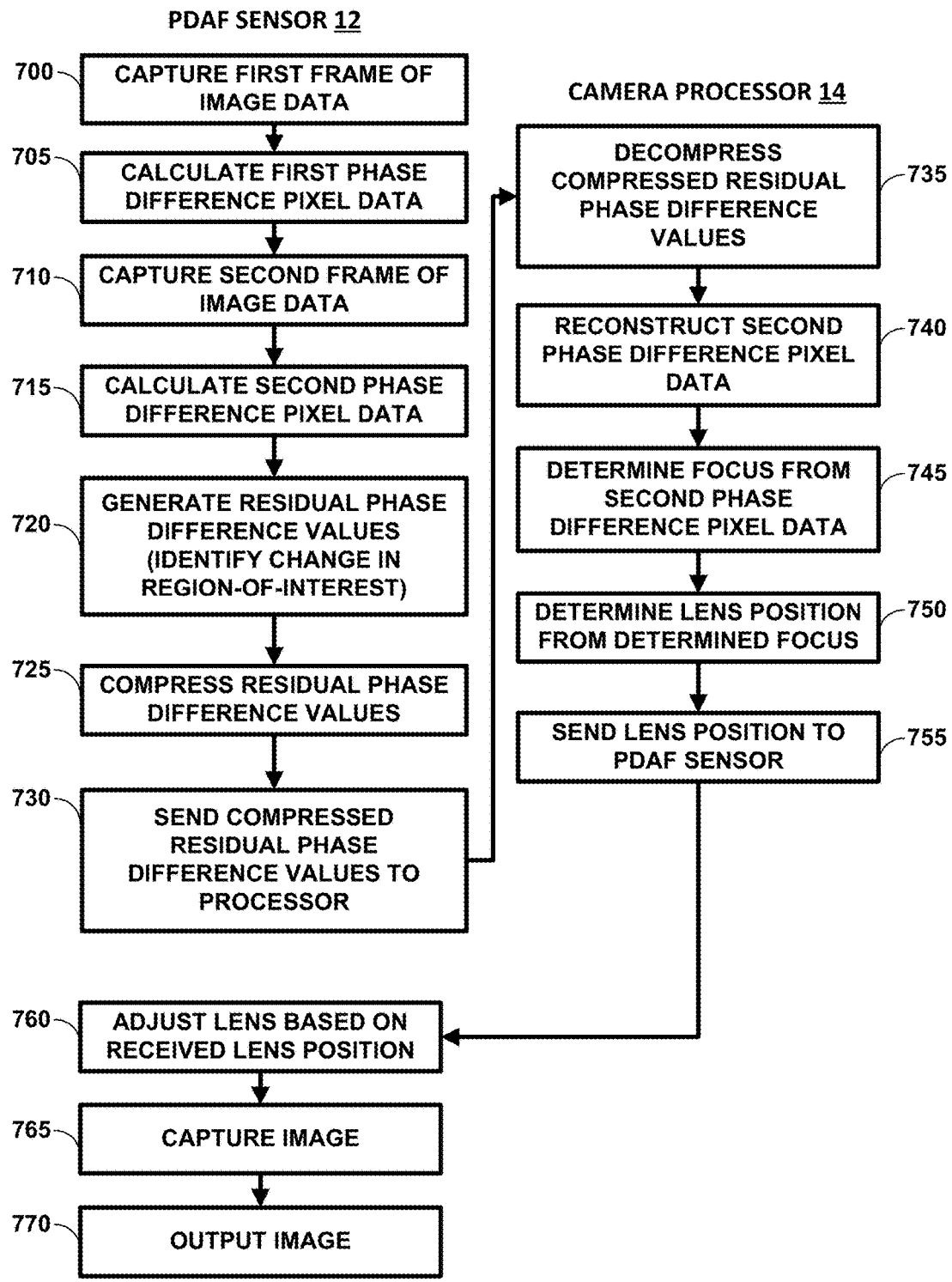
FIG. 7 is a flowchart showing an example method according to one example of the disclosure.

FIG. 7 is a flowchart showing an example method according to one example of the disclosure. In one example, camera processor 14 and sensor 12 may be configured to perform the techniques of FIG. 7. However, it should be understood that different processing circuits, including GPU 18 or CPU 16, may be configured to perform the techniques attributed to camera processor 14.

In one example of the disclosure, sensor 12 may be configured to capture consecutive frames of image data. For example, sensor 12 may be configured to capture a first frame of image data (700). In some examples, sensor 12 may be configured to continuously capture (e.g., at some predetermined frame rate) frames of image data, even if a user of computing device 10 has not instructed camera processor 14 to permanently capture and store an image (e.g., take a snapshot for a still image or record a video). As discussed above, sensor 12 may be a PDAF sensor that includes a plurality of dual photodiode (e.g., phase detection) pixels. In the process of capturing the first frame of image data, sensor 12 may be configured to capture both pixel data of the first frame of image data as well as phase difference pixel data. Camera processor 14 may use the pixel data and/or phase difference pixel data from frames captured by sensor 12 to configure the operation of sensor 12 (e.g., through an AEC or PDAF process).

In some examples, sensor 12 may be configured to calculate first phase difference pixel data from the first frame of image data (705). Any technique for calculating the phase difference pixel data may be used, including the techniques discussed above with reference to FIG. 3. Sensor 12 may be further configured to capture the second frame of image data (710), and calculate second phase difference pixel data from the second frame of image data (715). Sensor 12 may then be configured to generate residual phase difference values (720). Sensor 12 may generate the residual phase difference values by subtracting phase difference pixel data associated with the two frames of image data. In the example of FIG. 7, sensor 12 may be configured to subtract the second phase difference pixel data from the first phase difference pixel data to produce the residual phase difference values.

The difference in phase difference pixel values between two frames of image data (e.g., consecutive frames of frames that are two or more frames apart) may identify or be used to detect a region-of-interest change. That is, the areas of an image that have different phase difference pixel values in consecutive frames may be associated with a region-of-interest change in that area (e.g., the user has moved the camera direction between capturing the two frames). For example, if the user has not moved the camera between consecutive frames, it is likely that the residual phase difference values will be zero or close to zero. If the user has moved the camera between consecutive frames, some or all of the residual phase difference values will be non-zero. Non-zero phase difference values may indicate a change in region-of-interest, and thus a potential need for camera processor 14 to determine a new auto focus setting and send a new lens position setting to sensor 12. In this way, camera processor 14 may be configured to determine a focus for sensor 12 based on the detected region-of-interest change. Note that the techniques of this disclosure are not limited to a comparison of phase difference pixel values between consecutive frames. A more coarse sampling of phase difference values between frames may be used. For example, sensor 12 may be configured to simply compare phase difference pixel values between two frames (a first frame and a second frame) where the compared frames may be two or more frames apart.

Returning to FIG. 7, after generating the residual phase difference pixel values, sensor 12 may be configured to compress the residual phase difference values (725). Sensor 12 may use any technique to compress the residual phase difference values. In one example, sensor 12 may use a lossless compression technique to compress the residual phase difference values. For example, sensor 12 may use a run-length encoding technique to compress the residual phase difference values. After compression, sensor 12 may be configured to send the compressed residual phase difference values to camera processor 14 (730). By both generating residual phase difference values, and then compressing the residual phase difference values, sensor 12 is able to reduce the amount of data sent to camera processor 14.

With such a reduction in data sent to camera processor 14, camera processor 14 can be configured to operation at a lower clock rate. Furthermore, the clock rate of camera processor 14 may be dynamically configured to the data rate. For example, as the size of the compressed residual phase difference values increases (e.g., due to a panning camera or moving subjects in the camera field of view), the clock rate of camera processor 14 may be increased. Likewise, as the size of the compressed residual phase difference values decreases (e.g., due to a more still camera or more stable subjects in the camera field of view), the clock rate of camera processor 14 may be decreased.

Furthermore, referring back to FIG. 1, voting and traffic on bus 32 will decrease as camera processor 14 write less data to system memory 14. In other designs, even if there is no scene change, the entirety of the phase difference pixel data for the whole frame is sent to camera processing is sent to the camera processor 14 and processed. Processing the entirety of the phase difference pixel data takes a larger amount of computation power compared to only processing the compressed residual pixel difference values of this disclosure.

Returning to FIG. 7, after receiving the compressed residual phase difference values, camera processor 14 may be configured to decompress the residual phase difference values (735). Of course, camera processor 14 may be configured to decompress the residual phase difference values using the reciprocal process to that used to compress the residual phase difference values. In some examples, camera processor 14 may be configured to reconstruct the second phase difference pixel data from the compressed residual phase difference values (740). Camera processor 14 may be configured to reconstruct the second phase difference pixel data by adding the decompressed residual phase difference values to the first phase difference pixel data that was previously obtained by camera processor 14.

In other examples, camera processor 14 may be configured to analyze the decompressed residual phase difference values and determine if it is necessary to reconstruct the second phase difference pixel data. For example, camera processor 14 may be configured to calculate of a sum of absolute differences of the decompressed residual phase difference values. If the sum of absolute differences is less than some predetermined threshold, camera processor 14 may determine to not reconstruct the entirety of the phase difference pixel data for the second frame, and not determine a new auto focus setting for sensor 12. That is, if the sum of absolute difference of the decompressed phase difference values is less than a predetermined threshold, camera processor 14 may determine that the focus setting will not change relative to an earlier frame, and thus camera processor 14 will not need to determine a new focus setting (e.g., lens position). If the sum of absolute difference of the decompressed phase difference values is greater than a predetermined threshold, camera processor 14 may determine that the focus setting may or will likely change relative to an earlier frame, and thus camera processor 14 will reconstruct the phase difference pixel data for the second frame and determine a new auto focus setting.

In the case that camera processor 14 reconstructs the second phase difference pixel data, camera processor 14 may be further configured to determine the focus for sensor 12 from the reconstructed second phase difference pixel data (745). As discussed above, from the phase difference pixel data, camera processor 14 may be configured to calculate a defocus distance. Based on the defocus distance, camera processor may determine a lens position for sensor 12 (750). Camera processor 14 may then send the determined lens position to PDAF sensor 12 (755).

Sensor 12 may adjust the lens (e.g., using an actuator) based on the received lens position (760). Sensor 12 may then capture an image (765) and then output the image (770). For example, sensor 12 may send the pixel data of the image back to camera processor 14 for further processing and/or storage.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, the method comprising:
   receiving residual phase difference values from a phase detection auto focus (PDAF) sensor of a camera, the residual phase difference values resulting from subtracting phase difference pixel data associated with two frames of image data;
   detecting a region-of-interest change based on the residual phase differences values; and
   determining a focus for the camera based on the detected region-of-interest change.

2. The method of claim 1, wherein the two frames of image data include a first frame of image data and a second frame of image data, the method further comprising:
   capturing the first frame of image data with the PDAF sensor;
   calculating first phase difference pixel data from the first frame of image data;
   capturing the second frame of image data with the PDAF sensor; and
   calculating second phase difference pixel data from the second frame of image data.

3. The method of claim 2, further comprising:
   subtracting the second phase difference pixel data from the first phase difference pixel data to produce the residual phase difference values;
   compressing the residual phase difference values;
   sending the compressed residual phase difference values to a processor; and
   reconstructing, with the processor, the second phase difference pixel data from the compressed residual phase difference values.

4. The method of claim 3, wherein compressing the residual phase difference values comprises run-length encoding the residual phase difference values.

5. The method of claim 3, further comprising:
   determining the focus for the camera based on the reconstructed second phase difference pixel data.

6. The method of claim 5, further comprising:
   determining a lens position based on the determined focus;
   sending information indicating the lens position to the PDAF sensor; and
   adjusting a lens of the camera based on the information indicating the lens position.

7. The method of claim 6, further comprising:
   capturing an image using the adjusted lens of the camera; and
   outputting the captured image to a memory.

8. The method of claim 1, wherein the two frames of image data are one of two frames of still image data or two frames of video data.

9. An apparatus configured for image processing, the apparatus comprising:
   a memory configured to store image data; and
   a processor in communication with the PDAF sensor, the processor configured to:
   receive residual phase difference values associated with the image data from a phase detection auto focus (PDAF) sensor of a camera, the residual phase difference values resulting from subtracting phase difference pixel data associated with the two frames of image data;
   detect a region-of-interest change based on the residual phase differences values; and
   determine a focus for the camera based on the detected region-of-interest change.

10. The apparatus of claim 9, wherein the two frames of image data include a first frame of image data and a second frame of image data, the apparatus further comprising the camera having the PDAF sensor, the PDAF sensor configured to:
    capture the first frame of image data;
    calculate first phase difference pixel data from the first frame of image data;
    capture the second frame of image data; and
    calculate second phase difference pixel data from the second frame of image data.

11. The apparatus of claim 10, wherein the PDAF sensor is further configured to:
    subtract the second phase difference pixel data from the first phase difference pixel data to produce the residual phase difference values;
    compress the residual phase difference values; and
    send the compressed residual phase difference values to the processor, and wherein the processor is further configured to:
    reconstruct the second phase difference pixel data from the compressed residual phase difference values.

12. The apparatus of claim 11, wherein to compress the residual phase difference values, the PDAF sensor is further configured to run-length encode the residual phase difference values.

13. The apparatus of claim 11, wherein the processor is further configured to:
    determine the focus for the camera based on the reconstructed second phase difference pixel data.

14. The apparatus of claim 13, wherein the processor is further configured to:
    determine a lens position based on the determined focus; and
    send information indicating the lens position to the PDAF sensor, and wherein the PDAF sensor is further configured to:
    adjust a lens of the camera based on the information indicating the lens position.

15. The apparatus of claim 14, wherein the PDAF sensor is further configured to:
    capture an image using the adjusted lens; and
    output the captured image to a memory.

16. The apparatus of claim 10, wherein the two frames of image data are one of two frames of still image data or two frames of video data.

17. The apparatus of claim 10, wherein the PDAF sensor includes a plurality of dual photodiode pixel sensors.

18. The apparatus of claim 10, wherein the PDAF sensor is one of a type 2 PDAF or a type 3 PDAF sensor.

19. The apparatus of claim 9, wherein the processor is an image signal processor.

20. The apparatus of claim 9, wherein the apparatus of one of a mobile device, a mobile telephone, a tablet computer, a laptop computer, a digital camera, or a digital video recorder.

21. An apparatus configured for image processing, the apparatus comprising:
    means for receiving residual phase difference values from a phase detection auto focus (PDAF) sensor of a camera, the residual phase difference values resulting from subtracting phase difference pixel data associated with two frames of image data to produce residual phase difference values;

means for detecting a region-of-interest change based on the residual phase differences values; and means for determining a focus based on the detected region-of-interest change.

22. The apparatus of claim 21, wherein the two frames of image data include a first frame of image data and a second frame of image data, the apparatus further comprising:

means for capturing the first frame of image data;

means for calculating first phase difference pixel data from the first frame of image data;

means for capturing the second frame of image data; and means for calculating second phase difference pixel data from the second frame of image data.

23. The apparatus of claim 22, further comprising:

means for subtracting the second phase difference pixel data from the first phase difference pixel data to produce the residual phase difference values;

means for compressing the residual phase difference values;

means for sending the compressed residual phase difference values to a processor; and means for reconstructing, with the processor, the second phase difference pixel data from the compressed residual phase difference values.

24. The apparatus of claim 23, further comprising:

means for determining the focus based on the reconstructed second phase difference pixel data.

25. The apparatus of claim 24, further comprising:

means for determining a lens position based on the determined focus;

means for sending information indicating the lens position; and means for adjusting a lens based on the information indicating the lens position.

26. A non-transitory computer-readable storage medium storing instructions that, when executed, causes one or more processor to:

receive residual phase difference values from a phase detection auto focus (PDAF) sensor of a camera, the residual phase difference values resulting from subtracting phase difference pixel data associated with two frames of image data to produce residual phase difference values;

detect a region-of-interest change based on the residual phase differences values; and determine a focus for the camera based on the detected region-of-interest change.

27. The non-transitory computer-readable storage medium of claim 26, wherein the two frames of image data include a first frame of image data and a second frame of image data, and wherein the instructions further cause the one or more processor to:

capture the first frame of image data with the PDAF sensor;

calculate first phase difference pixel data from the first frame of image data;

capture the second frame of image data with the PDAF sensor; and calculate second phase difference pixel data from the second frame of image data.

28. The non-transitory computer-readable storage medium of claim 27, wherein the instructions further cause the one or more processors to:

subtract the second phase difference pixel data from the first phase difference pixel data to produce the residual phase difference values;

compress the residual phase difference values;

send the compressed residual phase difference values to a processor; and reconstruct, with the processor, the second phase difference pixel data from the compressed residual phase difference values.

29. The non-transitory computer-readable storage medium of claim 28, wherein the instructions further cause the one or more processor to:

determine the focus for the camera based on the reconstructed second phase difference pixel data.

30. The non-transitory computer-readable storage medium of claim 29, wherein the instructions further cause the one or more processor to:

determine a lens position based on the determined focus;

send information indicating the lens position to the PDAF sensor; and adjust a lens of the camera based on the information indicating the lens position.

* * * * *